Feb. 16, 1926.

H. NEUMANN

ANTISKID DEVICE

Filed Nov. 3, 1924

1,573,736

Herman Neumann
INVENTOR

BY Victor J. Evans
ATTORNEY

Patented Feb. 16, 1926.

1,573,736

UNITED STATES PATENT OFFICE.

HERMAN NEUMANN, OF NEW YORK, N. Y.

ANTISKID DEVICE.

Application filed November 3, 1924. Serial No. 747,598.

*To all whom it may concern:*

Be it known that I, HERMAN NEUMANN, a citizen of the United States, residing at New York city, in the county of New York and State of New York, have invented new and useful Improvements in Antiskid Devices, of which the following is a specification.

This invention relates to anti-skid devices for use upon vehicle wheels.

The principal object of the invention is to provide an attachment to a vehicle wheel which may be quickly applied for driving a vehicle over wet or icy roads to give the wheel a better traction surface to overcome the danger of skidding.

Another object of the invention is the provision of a device which is collapsible and which is adjustable to wheels of various diameters and which will fit the wheel in a neat and snug manner so as not to detract from the attractive appearance of the vehicle.

Another object resides in the construction of an anti-skid device which may be folded in a compact manner when not in use to permit the same to be carried within the vehicle for instant use in an emergency.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1:
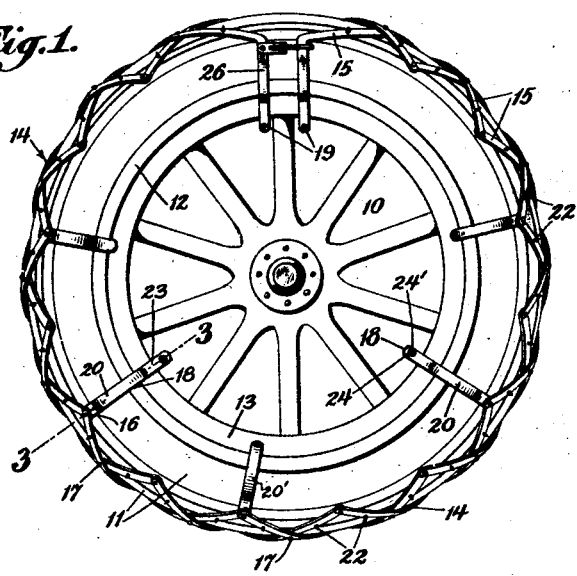
Figure 1 is a side elevation of a vehicle wheel with my invention applied thereto.

Referring more particularly to the drawing, the reference numeral 10 designates a vehicle wheel of the usual well-known construction, and which includes a tire 11, a rim 12, and a felly 13, and to which my invention shown in its entirety as at 14 is attached.

My attachment comprises a plurality of cross links 15 which are pivotally connected together at their meeting ends as at 16 and midway between their ends as at 17. Any number of links may be employed depending upon the circumference of the wheel and the same are slightly curved to snugly fit the contour of the tire. The links serve to provide an attachment based on the "lazy tong" principle and may be expanded or contracted according to the occasion.

For securing the device to the wheel I provide two separate means 18 and 19, the latter means serving to connect the meeting ends of the device, and the former acting to lock the device about the tire to prevent creeping of the same.

Figure 3:
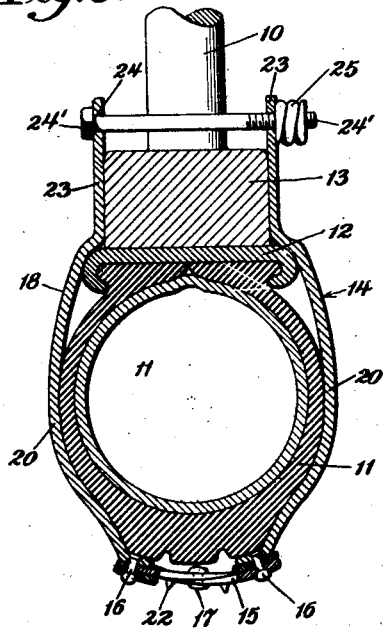
Figure 3 is a transverse sectional view on the line 3—3 of Figure 1.
Figure 2:
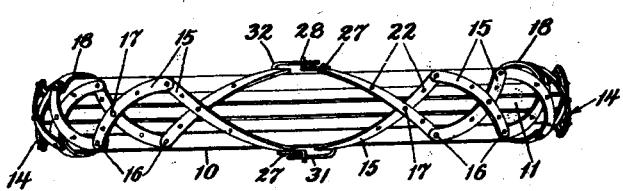
Figure 2 is a top plan view of the same.

The means 18 comprises a plurality of metal strips 20 of a shape to snugly surround the sides of the tire, rim and felly as shown in Figure 3 of the drawing. The strips are arranged in pairs diametrically opposite each other and extend between certain spokes of the wheel. Each strap or member 20 is connected with the pivot 16 of certain links. The heads of the pivots 16 and 17 coact with removable pins 22 carried by the links for providing a tread surface capable of resisting any skidding action of the wheel when in motion. The straps are each formed with a leg 23 having an opening 24 adjacent the free end and the legs engage the sides of the felly and extend inwardly of the same, to permit bolts 24' to be inserted through aligned openings in the opposed straps when the structure is in position upon the wheel. Additional gripping straps 20' are interposed between the straps 20 and 26 which only engage the tire and rim and which co-act with the said straps 20 and 26 for preventing lateral movement of the device upon the tire.

A resilient lock nut 25 co-acts with the threaded end of the bolt and is formed of a single piece of material wound to provide a spiral of a pitch contrary to the pitch of the threads on the bolt, whereupon the nut when jammed against the leg 23 will tend to prevent retrograde movement of the nut. The means 19 comprises a pair of straps 26 formed on the end links 15 and which are similar to the straps 20 with the exception that they are formed integral with the links. The same securing means is employed for connecting the pairs of straps 26 as for connecting the opposed straps 20. The end links 15 at one end of the device support brackets 27 having outwardly extending ears 28 and each ear is formed with a threaded opening 30 for co-action with the threaded end of a member 31, one end of which is formed with a hook 32 for engagement with the end straps 26 of the opposite meeting end. The member is adjustable with respect to the bracket and serves to connect the meeting ends of the device when in applied position.

Figure 4:
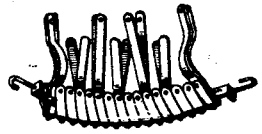
Figure 4 is a side elevation of my device in a collapsed position.

From the foregoing description, it will be seen that when not in use, the structure may be collapsed to the position shown in Figure 4 of the drawing and when it is desired to apply the device to a wheel, the same is placed beneath the wheel and the ends drawn toward each other until the meeting ends are adjacent, after which the device is secured to the wheel by the means 18 and 19, herefore described. Only two of these devices are needed in connection with a motor vehicle and are attached to the rear wheels as will be readily understood. The device is easily and quickly applied and affords the maximum protection against skidding on icy or slippery road beds.

Figure 7:
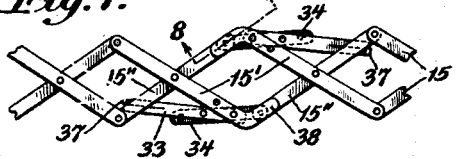
Figure 7 is a similar view but showing the position of the parts when locked.
Figure 5:
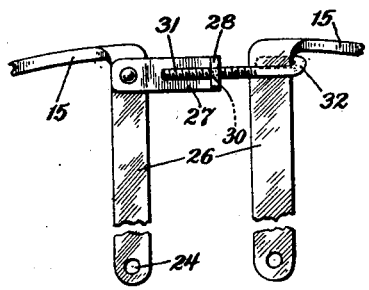
Figure 5 is a detail view of the manner of connecting the meeting ends of the device when in position upon a wheel.
Figure 6:
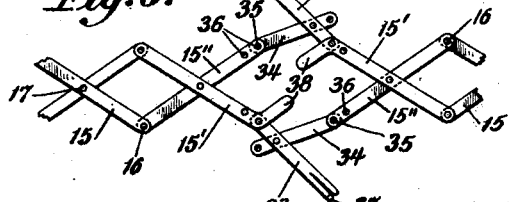
Figure 6 is a detail view of a modified form of connecting means, showing the parts prior to being brought to locking position.
Figure 8:
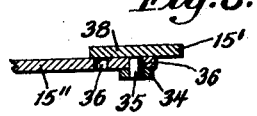
Figure 8 is a detail sectional view on the line 8—8 of Figure 7.

In Figures 6, 7 and 8, I have shown a modified form of means for connecting the meeting ends of the device. The end cross links 15' each have a lever 33 pivoted thereto which lever has pivoted thereto an arm 34 having its free end provided with a pin 35 for reception in one of the recesses 36 in the end links 15''. Each lever 33 is formed at its free end with an upstanding lug 37 for locking engagement with the respective links 15'' when the parts are in locked position. Each link 15' is formed with an offset extension 38 for overlying the pin 35 and openings 36 whereby to lock the pins in the openings. The connecting means here shown operate on the toggle principle and draw the meeting ends of the device in intimate contact.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. An anti-skid device for vehicle wheels comprising an extensible member formed of a plurality of pivoted links, oppositely disposed straps carried by the meeting ends of certain of said links for clamping engagement with the tire, rim and felly of a wheel.

2. An anti-skid device for vehicle wheels comprising an extensible member formed of a plurality of pivoted links, oppositely disposed straps carried by the meeting ends of certain of said links for clamping engagement with the tire, rim and felly of a wheel and adjustable members on one of the free ends of said extensible member for engagement with the other free end, for connecting the meeting ends of said extensible member.

3. An anti-skid device comprising a lazy-tong structure engageable with the tread surface of a vehicle wheel, and means for securing said structure thereon, said means including oppositely disposed straps extending from said structure for clamping engagement with the tire, rim, and felly of a wheel and co-acting adjusting means between the meeting end straps.

In testimony whereof I have affixed my signature.

HERMAN NEUMANN.